United States Patent
Kim

(10) Patent No.: US 8,140,002 B2
(45) Date of Patent: Mar. 20, 2012

(54) APPARATUS AND METHOD FOR CONTROLLING RADIO FREQUENCY IN PORTABLE COMMUNICATION SYSTEM

(75) Inventor: Dong-Han Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 1102 days.

(21) Appl. No.: 11/936,552

(22) Filed: Nov. 7, 2007

(65) Prior Publication Data
US 2008/0106464 A1    May 8, 2008

(30) Foreign Application Priority Data
Nov. 8, 2006 (KR) .................. 10-2006-0109889

(51) Int. Cl.
*H04H 20/71* (2008.01)
*H04M 3/42* (2006.01)

(52) U.S. Cl. .............. 455/3.01; 455/3.02; 455/414.2

(58) Field of Classification Search .......... 455/3.01, 455/3.02, 3.06, 414.2, 135, 151.1, 188.1, 455/226.1, 456.3
See application file for complete search history.

(56) References Cited

U.S. PATENT DOCUMENTS

| | | | | |
|---|---|---|---|---|
| 4,491,975 | A * | 1/1985 | Ito | 455/166.1 |
| 5,539,635 | A * | 7/1996 | Larson, Jr. | 700/234 |
| 5,864,579 | A * | 1/1999 | Briskman | 375/130 |
| 6,041,235 | A | 3/2000 | Aalto | |
| 6,535,717 | B1 * | 3/2003 | Matsushima et al. | 455/18 |
| 6,608,994 | B1 * | 8/2003 | Wegener et al. | 455/3.06 |
| 7,068,217 | B2 * | 6/2006 | Kobayashi | 342/357.15 |
| 7,110,772 | B1 * | 9/2006 | Wu | 455/456.1 |
| 7,369,825 | B2 * | 5/2008 | Slupe | 455/161.3 |
| 7,373,123 | B2 * | 5/2008 | Spellman | 455/186.1 |
| 7,409,205 | B2 * | 8/2008 | Mittal | 455/414.1 |
| 7,672,654 | B2 * | 3/2010 | Okada | 455/232.1 |
| 7,840,178 | B2 * | 11/2010 | Hellman | 455/3.02 |
| 2006/0223469 | A1 * | 10/2006 | Shibata | 455/226.1 |

FOREIGN PATENT DOCUMENTS

| | | |
|---|---|---|
| KR | 1019990069359 | 9/1999 |
| KR | 1019990084479 | 12/1999 |
| KR | 1020010001797 | 1/2001 |

* cited by examiner

*Primary Examiner* — Sonny Trinh
(74) *Attorney, Agent, or Firm* — The Farrell Law Firm, P.C.

(57) ABSTRACT

Provided is an apparatus and method for altering a frequency of a radio broadcast. The apparatus includes a communication unit, a memory, a radio frequency management unit, and a controller. The communication unit receives a radio broadcast including information on a channel of the radio broadcast and a transmission intensity of the radio broadcast. The memory stores a threshold of an intensity of radio wave for determining a quality of the radio broadcast.

3 Claims, 4 Drawing Sheets

APPARATUS AND METHOD FOR CONTROLLING RADIO FREQUENCY IN PORTABLE COMMUNICATION SYSTEM

PRIORITY

This application claims priority under 35 U.S.C. §119(a) to an application filed in the Korean Intellectual Property Office on Nov. 8, 2006 and assigned Serial No. 2006-109889, the contents of which are incorporated herein by reference.

BACKGROUND OF THE INVENTION

1. Field of the Invention

The present invention relates generally to a portable communication system capable of receiving a radio broadcast, and in particular, to an apparatus and method for receiving and automatically altering frequency information on a radio broadcast depending on position in a portable communication system capable of receiving a radio broadcast.

2. Description of the Related Art

In recent years, a portable communication system, a necessity to modern people, is being used without age and sex-based distinctions. Service providers and system manufacturers are competitively developing products and services to differentiate from other enterprises.

For example, portable communication systems are evolving into multimedia equipments for a phone book, a game, a short message, an Electronic MAIL (e-mail), a morning call, an MPEG-1 Audio Layer 3 (MP3), a digital camera, and a radio broadcast, and provide a variety of services.

In particular, radio broadcast listening is one of the functions used by many users due to a convenience enabling the users to listen to a radio broadcast without carrying a separate apparatus for receiving the radio broadcast.

FIG. 1 illustrates a conventional procedure of altering a radio broadcast frequency in a radio receiver.

Referring to FIG. 1, there can be provided transmitters 101 and 103 for transmitting radio broadcasts and a portable communication system 100.

The transmitters transmit radio broadcasts that use the same channel but have different transmission frequencies.

In a case where the portable communication system 100 receives radio broadcasts from the transmitters 101 and 103, which transmit A-channels, while moving to an area where radio broadcasts are serviced on the same A-channel but a transmission radio wave has a great intensity, the portable communication system 100 provides a poor-quality radio broadcast (e.g., a radio broadcast mixed with noise).

Thus, there occurs a drawback in that a user receiving a poor-quality radio broadcast as above must directly search for a radio broadcast frequency to find a radio broadcast of better quality.

Also, there occurs a drawback that when a user selects the radio frequency in the above manner while moving by car, an unexpected accident may occur, because the user cannot concentrate on driving carefully.

Thus, an apparatus and method for, when a user listens to a radio through a portable communication system, automatically selecting a frequency of a good quality of service according to a user movement is required.

SUMMARY OF THE INVENTION

An aspect of the present invention is to substantially solve at least the above problems and/or disadvantages and to provide at least the advantages below. Accordingly, an aspect of the present invention is to provide an apparatus and method for selecting a radio frequency of a good quality of service in a course of listening to a radio through a portable communication system.

Another aspect of the present invention is to provide an apparatus and method for acquiring radio frequency information depending on an area in a portable communication system.

A further aspect of the present invention is to provide an apparatus and method for selecting a radio frequency of a good quality of service depending on radio frequency information in a portable communication system.

The above aspects are achieved by providing an apparatus and method for controlling a radio frequency in a portable communication system.

According to one aspect of the present invention, there is provided an apparatus for altering a frequency of a radio broadcast. The apparatus includes a communication unit, a memory, a radio frequency management unit, and a controller. The communication unit receives a radio broadcast including information on a channel of the radio broadcast and a transmission intensity of the radio broadcast. The memory stores a threshold of an intensity of a radio wave for determining a quality of the radio broadcast. The radio frequency management unit alters a frequency of a radio broadcast under a control of a controller. The controller identifies the channel and the transmission intensity of the radio broadcast when receiving the radio broadcast, checks whether there exists a radio broadcast frequency of a better quality than a frequency of the in-reception radio broadcast, and controls the radio frequency management unit to select the checked radio broadcast frequency for frequency alteration.

According to another aspect of the present invention, there is provided a method for altering a frequency of a radio broadcast in a portable communication system. The method includes, when receiving a radio broadcast comprising radio broadcast channel information and a transmission intensity, acquiring the channel information and the transmission intensity from the radio broadcast; when the acquired transmission intensity is less than or equal to a predefined threshold, searching a frequency of a radio broadcast having a transmission intensity greater than the threshold; and selecting a frequency of a good quality among the searched frequencies.

According to a further aspect of the present invention, there is provided a method for altering a frequency of a radio broadcast using position information in a portable communication system. The method includes identifying a position of the portable communication system using position information; acquiring radio broadcast frequencies receivable in the position; and selecting a radio broadcast frequency of a good quality among the acquired radio broadcast frequencies.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail. Below terms, which are defined considering functions in the present invention, can be different depending on a user's and an operator's intention or practice. Therefore, the terms should be defined on the basis of the disclosure throughout this specification.

An apparatus and method for receiving frequency information from a transmitter that transmits a multimedia broadcast and selecting a frequency of a good quality of service using the frequency information will be described below. The transmitter will be described on the assumption that the transmitter transmits the multimedia broadcast while having information on a channel and a signal intensity of the transmitted broadcast.

Multimedia broadcasts can include digital broadcasts (a digital multimedia broadcast, a digital video broadcast, and a digital audio broadcast) and a radio broadcast. The following description will be made on the basis of a radio broadcast.

Figure 1:
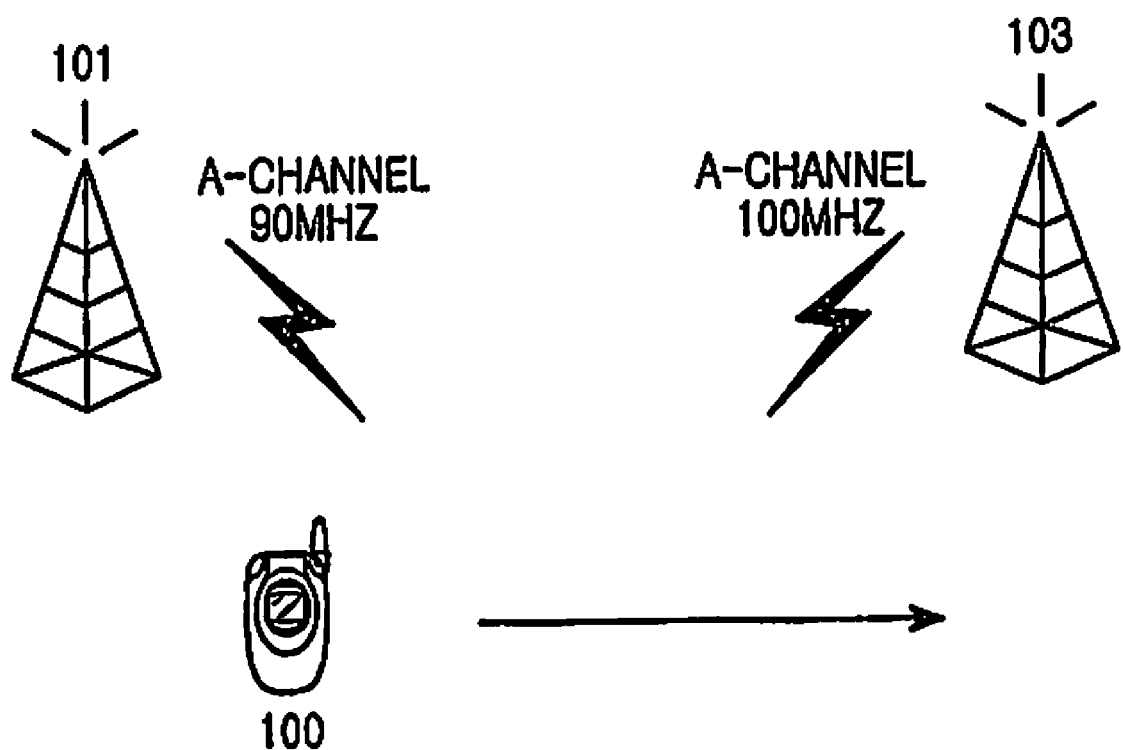
FIG. 1 is a diagram illustrating a conventional procedure of altering a radio broadcast frequency in a radio receiver.
Figure 2:
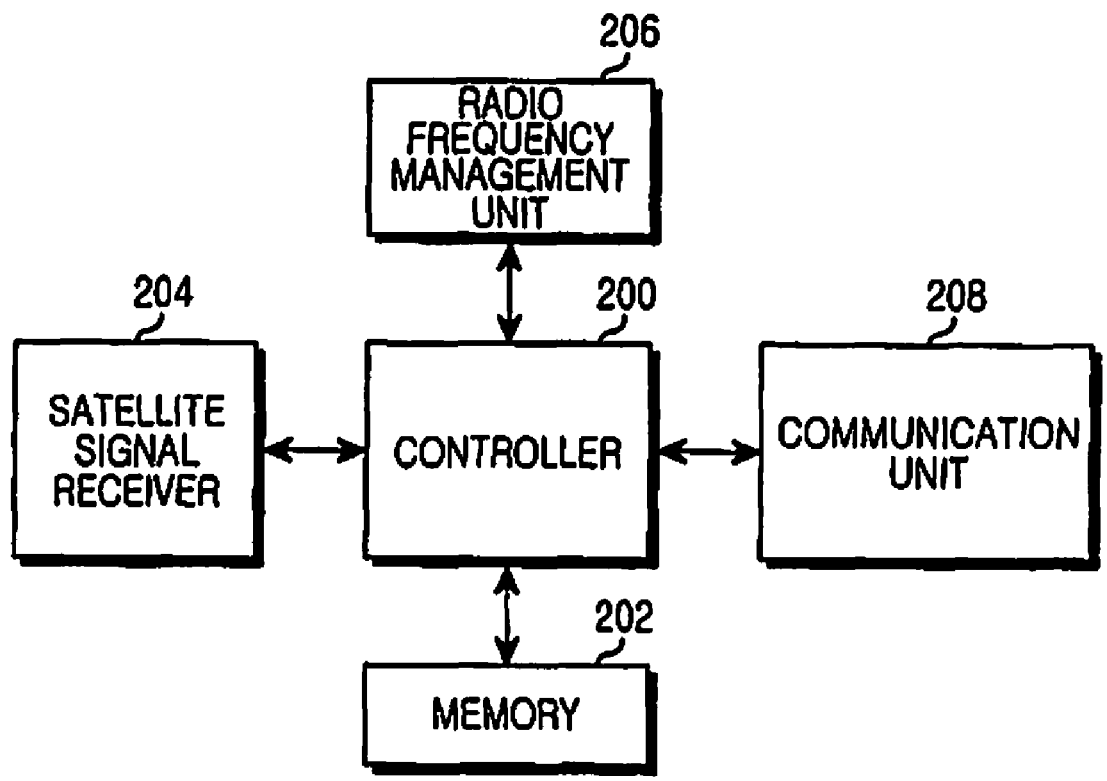
FIG. 2 is a block diagram illustrating an architecture of a portable communication system for altering a radio frequency according to the present invention.

FIG. 2 is a block diagram illustrating an architecture of a portable communication system for altering a radio frequency according to the present invention. In the following description, the portable communication system signifies the inclusion of all portable devices such as a mobile communication system supporting a radio reception function of a cellular phone, a Personal Communication System (PCS) phone, a Personal Digital Assistant (PDA), an International Mobile Telecommunications-2000 (IMT-2000) phone, and a 4-Generation (4G) broadband system phone. The following description will be made on the basis of a general example.

Referring to FIG. 2, the portable communication system can include a controller 200, a memory 202, a satellite signal receiver 204, a radio frequency management unit 206, and a communication unit 208.

The controller 200 can perform a function of the radio frequency management unit 206, and are separately constructed and shown in the present invention in order to distinguish and describe their respective functions. Thus, when a product is actually realized, it can be also constructed for the controller 200 to process all of the functions of the radio frequency management unit 206.

The controller (Micro-Processor Unit (MPU)) 200 controls a general operation of the portable communication system. For example, the controller 200 performs a process and a control for voice telephony and data communication. In addition to general functions, according to the present invention, when receiving a radio signal that includes information on an intensity of a transmission radio wave and a channel of a radio frequency, the controller 200 controls the radio frequency management unit 206 to compare intensities of transmission radio waves and select a radio frequency of a transmission radio wave having a great intensity.

The controller 200 receives a satellite signal, identifies a position of the portable communication system, and identifies a frequency of a channel that is equal to a preset channel among radio frequencies existing at the identified position.

The memory 202 consists of a Read Only Memory (ROM), a Random Access Memory (RAM), and a flash ROM. The ROM stores a micro code of a program for controlling the controller 200 and the radio frequency management unit 206 and various kinds of reference data.

The RAM, a working memory of the controller 200, stores temporary data generated in an execution of all programs. The flash ROM stores a phone book, an incoming/outgoing message, and frequency information on a radio broadcast receivable on a per-area basis.

The satellite signal receiver 204 receives position information for identifying a position of the portable communication system. The radio frequency management unit 206 alters a channel of a radio broadcast and a frequency of the radio broadcast under the control of the controller 200.

The communication unit 208 exchanges a radio signal of data input/output through an antenna (not shown). For example, in a transmission mode, the communication unit 208 processes data to be transmitted by channel coding and spreading, processes the data into a Radio Frequency (RF) signal format, and transmits the RF-processed data. In a reception mode, the communication unit 208 converts a received RF signal into a baseband signal, processes the baseband signal by de-spreading and channel decoding, and restores the processed signal to original data. According to the present invention, the communication unit 208 receives a radio broadcast including channel information on a radio frequency and intensity information on a transmission frequency transmitted by a transmitter.

Figure 3:
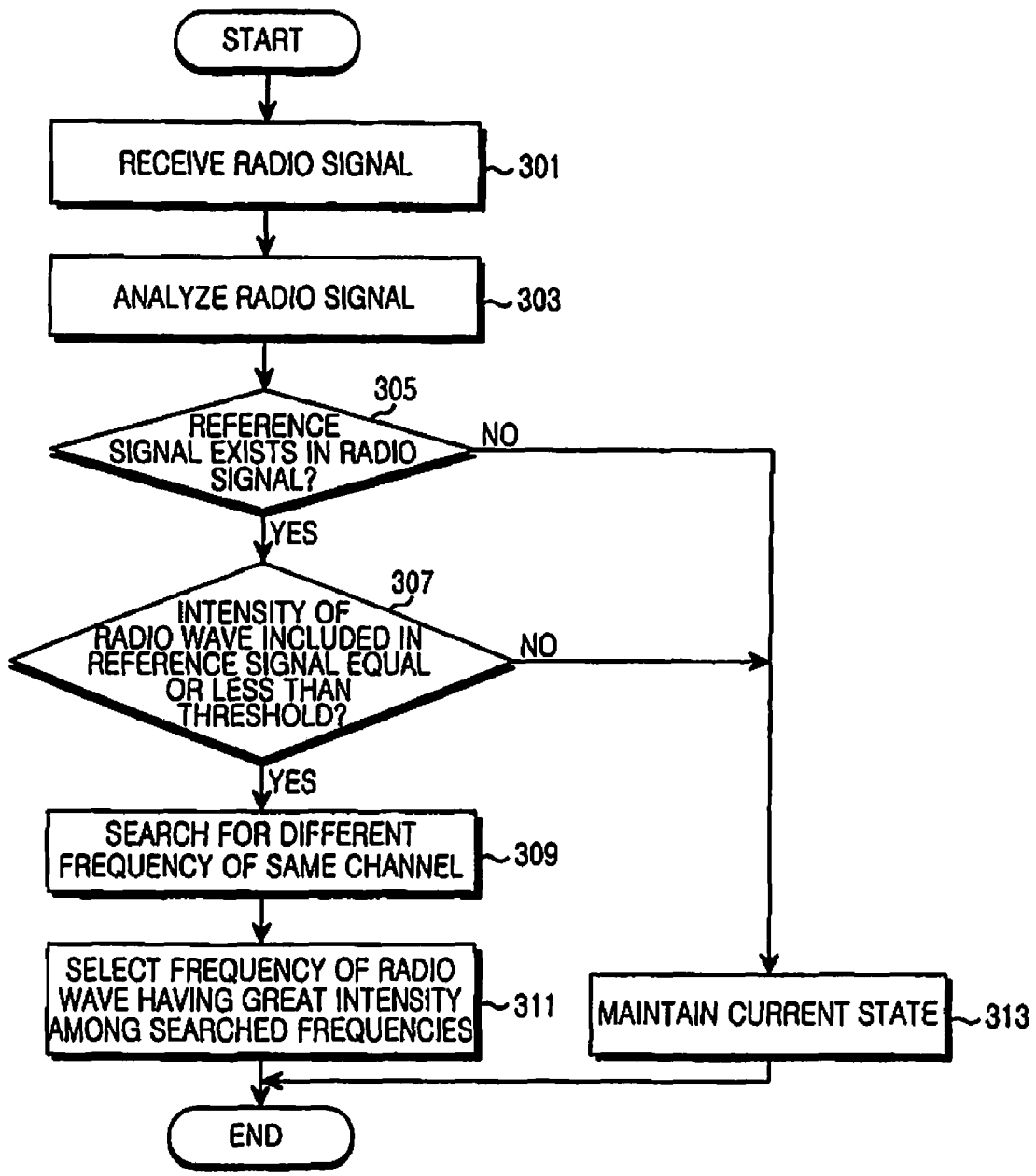
FIG. 3 is a flowchart illustrating a procedure for altering a radio frequency depending on a movement in a portable communication system according to the present invention.

FIG. 3 is a flowchart illustrating a procedure for altering a radio frequency in movement in a portable communication system according to the present invention.

Referring to FIG. 3, in Step 301, the controller 200 receives a radio signal through the communication unit 208. The radio signal includes a reference signal for informing channel information (e.g., Korean Broadcasting System (KBS), Turner Broadcasting System (TBS), etc.) of the radio signal and an intensity of a transmission radio wave according to the present invention. The reference signal can be included in the radio signal at regular intervals of time.

In Step 303, the controller 200 analyzes the radio signal. The analyzing of the radio signal is a process of checking whether the reference signal is included in the radio signal.

In other words, in Step 305, the controller 200 checks whether there exists the reference signal in the radio signal. If the reference signal is not in the radio signal, the controller 200 proceeds to Step 313 and maintains a current state. The maintaining of the current state refers to listening to the radio using a radio frequency previously selected by the controller 200.

In Step 307, upon determining that there exists the reference signal in the radio signal, the controller 200 identifies the reference signal and checks whether an intensity of a transmission radio wave of the radio signal is less than or equal to a threshold.

An intensity of the transmission radio wave less than or equal to the threshold signifies that the intensity of the radio signal is weakened. Inversely, an intensity of the transmission radio wave greater than the threshold signifies that the intensity of the radio signal is maintained to some degree of intensity that would cause no difficulty for a user listening to a radio broadcast.

In the Step 313, the controller 200 maintains a current state when the intensity of the transmission radio wave is greater than the threshold. Maintaining the current state refers to maintaining the in-reception frequency because the intensity of the transmission radio wave of the received radio signal is not an intensity of a degree that negatively impacts the user listening to the radio.

In Step 309, the controller 200 searches a different frequency of the same channel when the intensity of the transmission radio wave of the radio signal is less than or equal to the threshold. In Step 311, the controller 200 controls the radio frequency management unit 206 to select a frequency of a transmission radio wave having a great intensity from among the searched frequencies.

Then, the controller 200 terminates the present process.

Figure 4:
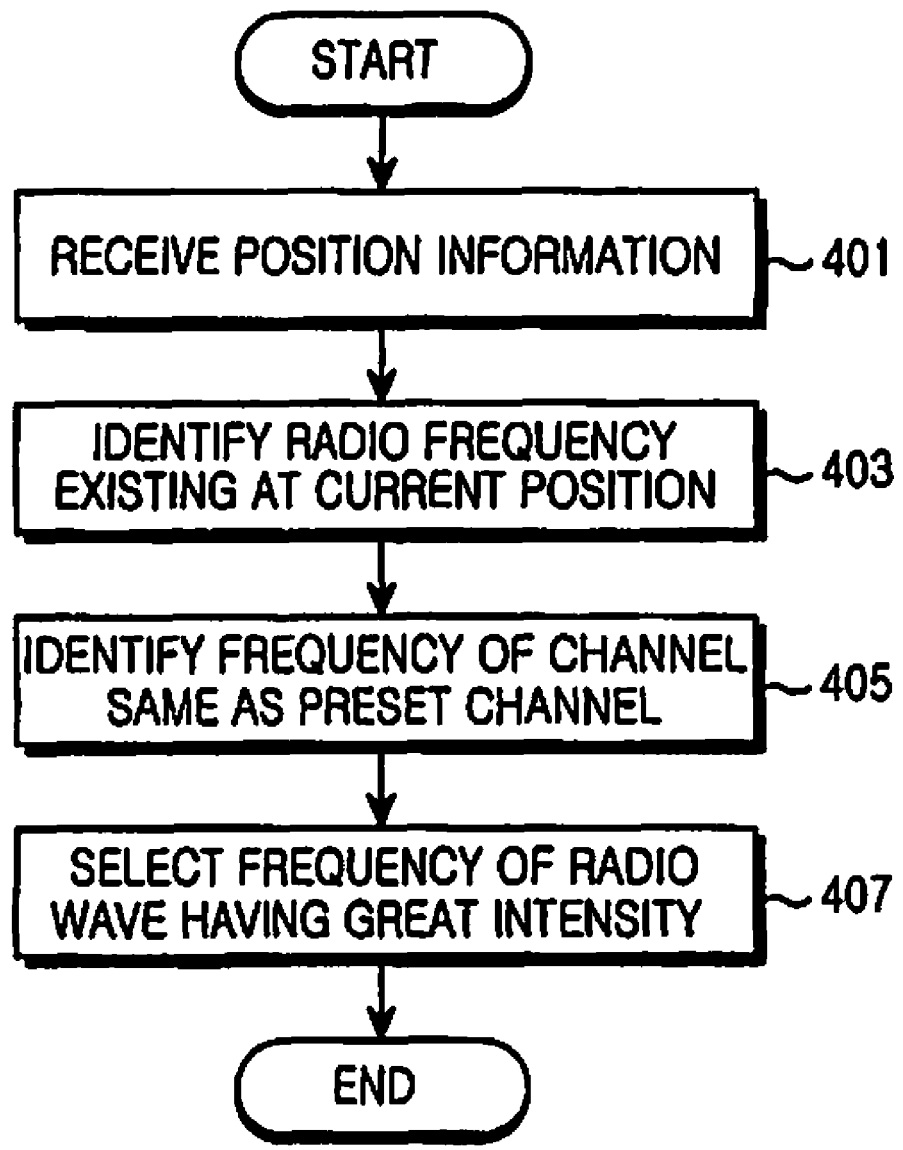
FIG. 4 is a flowchart illustrating a procedure for altering a radio frequency depending on a movement in a portable communication system according to the present invention.

FIG. 4 is a flowchart illustrating a procedure for altering a radio frequency in movement in a portable communication system according to the present invention.

Referring to FIG. 4, in Step 401, the controller 200 receives position information via the satellite signal receiver 204 and identifies a position of the portable communication system.

In Step 403, the controller 200 identifies a radio frequency existing at the position of the portable communication system. In Step 405, the controller 200 identifies a channel (e.g., a channel of the latest radio broadcast listened) preset to the portable communication system. In Step 405 the controller 200 identifies a frequency of the same channel as a radio channel that is preset to an area where the portable communication system is positioned.

In Step 407, the controller 200 controls the radio frequency management unit 206 to select a frequency of a transmission radio wave having a great intensity from among the frequencies of the same channel acquired in the Step 405, and then terminates the present process.

As described above, the present invention can check whether a portable communication system moves to a shadow area where an intensity of a radio broadcast is weak, using a reference signal of the radio broadcast received via the portable communication system. In the case of checking that the portable communication system moves to a shadow area, the present invention can select a frequency of a good quality from among radio broadcast frequencies existing around the portable communication system, using the reference signal of the radio broadcast, thereby overcoming the drawback of a frequency search that must be implemented as the portable communication system moves.

Alternate embodiments of the present invention can also comprise computer readable codes on a computer readable medium. The computer readable medium includes any data storage device that can store data that can be read by a computer system. Examples of a computer readable medium include magnetic storage media (such as Read-Only Memory (ROM), floppy disks, and hard disks, among others), optical recording media (such as Compact Disc (CD)-ROMs or Digital Versatile Discs (DVDs)), and storage mechanisms such as carrier waves (such as transmission through the Internet). The computer readable medium can also be distributed over network coupled computer systems so that the computer readable code is stored and executed in a distributed fashion. Also, functional programs, codes, and code segments for accomplishing the present invention can be construed by programmers of ordinary skill in the art to which the present invention pertains.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for altering a frequency of a radio broadcast, the apparatus comprising:
    a communication unit for receiving a radio broadcast comprising information on a channel of the radio broadcast and a transmission intensity of the radio broadcast;
    a memory for storing a threshold of an intensity of radio waves for determining a quality of the radio broadcast;
    a radio frequency management unit for altering a frequency of a radio broadcast under control of a controller;
    the controller for, when receiving the radio broadcast, identifying the channel and the transmission intensity of the radio broadcast, checking whether there exists a radio broadcast frequency of better quality than a frequency of the in-reception radio broadcast, and controlling the radio frequency management unit to select the checked radio broadcast frequency for a frequency alteration; and
    a satellite signal receiver for receiving position information on a system receiving the radio broadcast,
    wherein the controller receives the position information via the satellite signal receiver, identifies a position of the system, and identifies frequencies of the radio broadcast receivable in the identified position, and
    wherein after identifying the frequencies of the radio broadcast receivable in the identified position, the controller controls the radio frequency management unit to select a radio broadcast frequency of a good quality from among the identified radio frequencies.

2. A method for altering a frequency of a radio broadcast in a portable communication system, the method comprising:
    when receiving a radio broadcast comprising radio broadcast channel information and a transmission intensity, acquiring the channel information and the transmission intensity from the radio broadcast;
    when the acquired transmission intensity is less than or equal to a predefined threshold, searching a frequency of a radio broadcast having a transmission intensity greater than the threshold; and
    selecting a frequency of good quality among the searched frequencies,
    wherein the transmission intensity less than or equal to the threshold is an intensity of a state where the radio broadcast comprises noise because of a weakness of a radio broadcast frequency received in a position of the portable communication system.

3. A computer-readable recording medium having recorded thereon a program altering a frequency of a radio broadcast in a portable communication system, the method comprising:
    a first segment, for acquiring the channel information and a transmission intensity from the radio broadcast;
    a second segment, for when the acquired transmission intensity is less than or equal to a predefined threshold, searching a frequency of a radio broadcast having a transmission intensity greater than the threshold; and
    a third segment, for selecting a frequency of good quality among the searched frequencies,
    wherein the transmission intensity less than or equal to the threshold is an intensity of a state where the radio broadcast comprises noise because of a weakness of a radio broadcast frequency received in a position of the portable communication system.

* * * * *